(12) United States Patent
Varada et al.

(10) Patent No.: US 7,577,089 B2
(45) Date of Patent: Aug. 18, 2009

(54) METHODS AND APPARATUS FOR FAST ETHERNET LINK SWITCHOVER IN THE EVENT OF A LINK FAILURE

(75) Inventors: Srihari Varada, Shelton, CT (US); Michael Singngee Yeo, Shelton, CT (US); Diego Marty, Leuk-Stadt (CH); Timothy M. Shanley, Orange, CT (US)

(73) Assignee: Transwitch Corporation, Shelton, CT (US)

( * ) Notice: Subject to any disclaimer, the term of this patent is extended or adjusted under 35 U.S.C. 154(b) by 230 days.

(21) Appl. No.: 11/420,567

(22) Filed: May 26, 2006

(65) Prior Publication Data

US 2007/0274204 A1    Nov. 29, 2007

(51) Int. Cl.
    *H04J 3/17* (2006.01)
(52) U.S. Cl. .................................... 370/217; 370/225
(58) Field of Classification Search ......... 370/216–228; 714/2–4
    See application file for complete search history.

(56) References Cited

U.S. PATENT DOCUMENTS

| | | | |
|---|---|---|---|
| 6,094,439 A | 7/2000 | Krishna et al. | |
| 6,133,846 A | 10/2000 | Birkedahl et al. | |
| 6,178,178 B1 | 1/2001 | Wallace et al. | |
| 6,222,855 B1 | 4/2001 | Kimber et al. | |
| 6,343,330 B1 | 1/2002 | Khanna et al. | |
| 6,594,227 B1 | 7/2003 | Ogawa et al. | |
| 6,611,860 B1 | 8/2003 | Ying | |
| 6,640,314 B1 | 10/2003 | Lelaure et al. | |
| 6,715,023 B1 * | 3/2004 | Abu-Lebdeh et al. | 710/317 |
| 6,826,590 B1 | 11/2004 | Glanzer et al. | |
| 6,981,174 B1 * | 12/2005 | Hanning | 714/5 |
| 7,027,457 B1 | 4/2006 | Chiussi et al. | |
| 7,233,567 B1 * | 6/2007 | Li | 370/217 |
| 7,346,068 B1 | 3/2008 | Dan et al. | |
| 2003/0179754 A1 | 9/2003 | Shankar et al. | |
| 2004/0013124 A1 * | 1/2004 | Peebles et al. | 370/412 |
| 2007/0274204 A1 * | 11/2007 | Varada et al. | 370/218 |

OTHER PUBLICATIONS

"A comparison of the key WAN transport methods now available for delivering high-value Ethernet services" Carrier Ehternet—Defined, Lucent Technologies, 2005.
"Intel® LXT9785 and LXT9785E Advanced 8-Port 10/100 Mbps PHY Transceivers" Data Sheet, Document No. 249241, Apr. 30, 2004.
IEEE Std 802.3-2002®, Local and Metropolitan Area Networks, Section Two, 2002, pp. 136-162.
PACSystems™ High Availability, When uptime is absolutely essential, GE Fanuc, 2004.
Intel® Carrier Class Ethernet, White Paper, Document #249949, Feb. 19, 2002.

\* cited by examiner

*Primary Examiner*—Thai D Hoang
(74) *Attorney, Agent, or Firm*—Gordon & Jacobson, PC

(57) ABSTRACT

An apparatus for fast failure switch over in an ETHERNET switch includes redundant switch (trunk) ports (a main and a backup) and hardware and software logic for redirecting traffic to the backup port when the main port (or the link associated with it) fails. The switchover is immediate and is based on the content of a local status register which indicates the port (link) status. Thus, frames addressed to the dead port are redirected to the backup port and few frames are lost. The STP function may proceed concurrently and eventually no more frames are addressed to the dead port.

10 Claims, 12 Drawing Sheets

| Working Link | REVERTIVE setting | RESTORE TIME | Link Status | | Action |
|---|---|---|---|---|---|
| | | | Link 0 | Link 1 | |
| 0 (Primary) | DIS-ALLOWED (0) | DON'T CARE | OFF (0) | OFF | NO SWITCH |
| | | | OFF | ON (1) | SWITCH |
| | | | ON | OFF | NO SWITCH |
| | | | ON | ON | NO SWITCH |
| | ALLOWED (1) | | OFF | OFF | NO SWITCH |
| | | | OFF | ON | SWITCH |
| | | | ON | OFF | NO SWITCH |
| | | | ON | ON | NO SWITCH |
| 1 (Secondary) | DIS-ALLOWED (0) | | OFF | OFF | NO SWITCH |
| | | | OFF | ON | NO SWITCH |
| | | | ON | OFF | NO SWITCH |
| | | | ON | ON | NO SWITCH |
| | ALLOWED (1) | | OFF | OFF | NO SWITCH |
| | | | OFF | ON | NO SWITCH |
| | | ELAPSED (1) | ON | OFF | SWITCH |
| | | NOT ELAPSED (0) | | | NO SWITCH |
| | | ELAPSED | ON | ON | SWITCH |
| | | NOT ELAPSED | | | NO SWITCH |

FIG. 8

METHODS AND APPARATUS FOR FAST ETHERNET LINK SWITCHOVER IN THE EVENT OF A LINK FAILURE

BACKGROUND OF THE INVENTION

1. Field of the Invention

This invention relates broadly to telecommunications. More particularly, this invention relates to link failure recovery in an ETHERNET WAN (wide area network) or MAN (metropolitan area network).

2. State of the Art

ETHERNET was developed in the 1970s as a protocol for a local area network (LAN). Since it was first developed, ETHERNET has been improved, most notably in terms of bandwidth. Typical ETHERNET transmission bandwidths are 10 Mbps, 100 Mbps, and 1,000 Mbps (1 Gbps). A typical ETHERNET LAN can be found in most any modern office. Links from individual computers and printers are run to a central location where they are each attached to an individual port of a switch or router. Every device coupled to the router or switch has a MAC (media access control) address. Data is transmitted in the payload portion of a frame which contains the source MAC address and the destination MAC address as well as routing information. A switch maintains a forwarding information data base (FIB). When the switch is first activated, it must build the FIB to associate ports with MAC addresses in the FIB. As used herein, the terms "switch" and "ETHERNET switch" include "ETHERNET switch routers" which perform layer 2 switching.

About the same time ETHERNET was being developed, a protocol known as SONET (synchronous optical network) was being developed. SONET was designed to provide high capacity trunk connections between telephone company central offices. Individual telephone connections carried in a SONET signal frame are identified by their temporal location in the frame rather than by an address in the frame header. The SONET network is often arranged as a ring from central office to central office, always returning to the office of origin. Thus, telephone connections from one central office to another can be made in either the clockwise direction or the counterclockwise direction. In this way, redundancy is built into the SONET network and if a link between two central offices fails, connections can still be made by transmitting in the opposite direction. Links can fail in several ways, either by failure of equipment in a central office or by failure of the physical link between offices. The latter type of failure may occur when a worker accidentally breaks an underground cable. It is important that the public telephone network be kept up and running at all times and that if a link fails that it be corrected quickly. The SONET network is designed to achieve that goal.

ETHERNET was not designed to automatically switch over to a redundant link in the event of a link failure. The most likely link failure in an ETHERNET LAN is that a cable is accidentally pulled out of a socket and this is easy to repair. Other possible failures include equipment failure and that is relatively easy to diagnose and repair. Unlike the public telephone network, temporary failures of a link in an ETHERNET LAN are considered acceptable.

Recently it has become desirable to connect ETHERNET LANs through a SONET WAN or an ETHERNET MAN. By connecting LANs to a WAN, nationwide businesses can provide high speed data communication among all of its offices. By connecting LANs to a MAN, LAN users can obtain very high speed access to the internet. MANs and WANs are typically not owned by the users as LANs are. MANs and WANs are usually owned by a service provider, e.g. a telephone company or internet service provider, and the users pay a monthly fee for use of the network. As such, users expect that the MAN or WAN will be available continuously and that any link failure will be corrected quickly. It is also worthwhile noting that the type of data serviced by a MAN or a WAN may be different from that serviced by a LAN. LANs typically service email, web browsing, file sharing and printing. Brief interruption of these services is tolerable. MANs and WANs may likely service video on demand, video conferencing, voice over IP, etc. These data services suffer noticeably from even brief interruptions.

International Telecommunications draft recommendation ITU-T G.803/Y.1342 includes provisions for providing redundant paths between end stations so that service can continue in the event of a component failure. Redundant paths exist in two places: the user-network interface and in a switch fabric. The effort to reduce service outages is part of a broader concept referred to as quality of service or QoS. QoS is generally a guaranteed level of service in exchange for subscriber charges. If QoS is not met, the customer will get a refund. Because different customers have different QoS requirements, the standards for ETHERNET transmission over WANs and MANs includes provisions for up to eight classes of service or CoS, though typically only four classes are implemented. The higher the CoS, the more a customer pays for service. Switches used in ETHERNET transmission over WANs and MANs maintain two databases: the FIB discussed above and a class DB which associates a CoS with each active port. When the switch is first activated, it must build the FIB and class DB to associate ports with MAC addresses in the FIB and to associate certain routing and QoS rules with ports in the class DB. When the switch receives an ETHERNET frame from a particular port, it associates the source MAC address, routing and QOS rules with the port it was received from and makes corresponding entries in the FIB. The class DB is setup by the switch operator or by layer 2 control protocols. However, at this time in the startup of the switch, there is no FIB entry for the destination address. Therefore, the switch performs "flooding" and sends copies of the received frame out on all of the ports other than the port from which the frame was received. Eventually, over time, a frame is received from every port to which devices are coupled and the databases are complete.

Several protocols have been proposed to add redundancy and fault protection to ETHERNET switches used in WANs and MANs. The Spanning Tree Protocol (STP) provides a loop free network topology by putting redundant paths in a disabled stand-by mode. These protocols also include providing two separate physical links between the customer equipment and the service provider equipment. If one of the links (or one of the ports servicing that link) fails, the equipment switches to the backup link. In order to determine when a link or port fails, periodic "keep-alive frames" are transmitted, e.g. one per second. If a keep alive frame fails to be received on time, it is assumed that the port (or link) associated with the missing frame is down and steps are taken to switch over to the redundant link. When this happens, the FIB and class DB must be updated. This can take several seconds during which time frames are lost because they continue to be sent out on a dead port (link). In order to enable rapid link failure detection, IEEE 802.3 provides for Far-End Fault Detect and Far-End Fault Generate functions for switches that do not support autonegotiation. These functions enable the detection of a far end fault within 336 microseconds which is substantially faster than waiting for a keep-alive frame. However, even with the Far-End Fault Detect and Far-End Fault Generate functions enabled, it still can take several seconds for the FIB and class DB to be updated.

SUMMARY OF THE INVENTION

It is therefore an object of the invention to provide methods and apparatus for fast failure switchover in an ETHERNET link.

It is another object of the invention to provide methods and apparatus for fast failure switchover in an ETHERNET user-network interface.

It is a further object of the invention to provide methods and apparatus for fast failure switchover in an ETHERNET switch fabric interface.

In accord with these objects, which will be discussed in detail below, an apparatus for fast failure switchover in an ETHERNET switch includes redundant switch (trunk) ports (a main and a backup) and hardware and software logic for redirecting traffic to the backup port when the main port (or the link associated with it) fails. The switchover is immediate (on the order of tens of microseconds and is based on the content of a local status register which indicates the port (link) status. Thus, frames addressed to the dead port are redirected to the backup port and few frames are lost. The STP function may proceed concurrently and eventually no more frames are addressed to the dead port. According to a presently preferred embodiment, the hardware includes two FIFOs (one for each port) and two multiplexers. The hardware includes two state machines, one for controlling each multiplexer. Software logic includes a timer and variables which determine which of the two links is the working link and whether or not it is permitted to revert to the original link when it is restored. The timer is preferably set to 25 ms. Thus, the maximum time from link failure to switch-over is between 25 and 26 ms.

According to another aspect of the invention, the user-network interface includes (in the upstream part) a plurality of upstream ETHERNET ports coupled to customer equipment, firmware logic coupled to the upstream ports, a plurality of queues coupled to the firmware logic, a plurality of schedulers coupled to hardware logic, at least two ETHERNET uplink ports coupled to the hardware logic and software logic coupled to the hardware logic and the firmware logic. The firmware logic is coupled to an FIB, a class DB, a mirror copy of the class DB and, optionally, a mirror copy of the FIB. The hardware logic includes two output queues coupled to a cross-connect switch coupled to two uplink ports and an uplink status register associated with each uplink port. The software logic examines the status registers and operates the cross connect switch to redirect frames from a failed uplink to a backup uplink. While the frames are being redirected, the interface uses the mirror copies of the FIB and class DB and STP updates the main FIB and class DB. When the update is complete, the interface switches back to using the main FIB and class DB.

Additional objects and advantages of the invention will become apparent to those skilled in the art upon reference to the detailed description taken in conjunction with the provided figures.

BRIEF DESCRIPTION OF THE DRAWINGS

FIG. 8 is a truth table illustrating the logic of the protection switching function

DETAILED DESCRIPTION OF THE PREFERRED EMBODIMENTS

Figure 1:
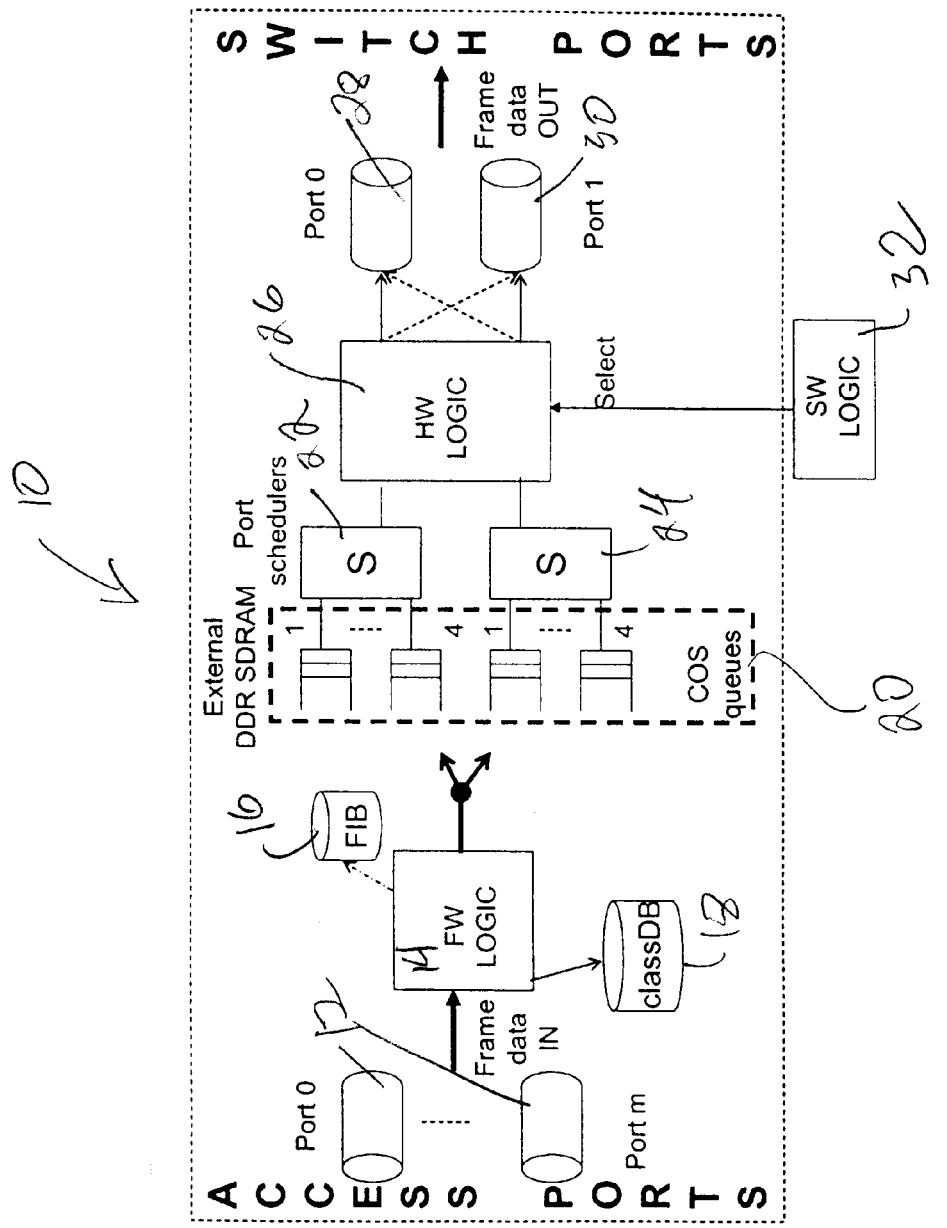
FIG. 1 is a high level block diagram of a provider premises ETHERNET switch incorporating the invention.

Turning now to FIG. 1, a provider premises switch 10 incorporating the invention includes a plurality of access ports 12 (Ports 0 through m) which are coupled to user network interface switches (not shown) at subscriber premises. The access ports 12 are coupled to firmware logic 14 which is coupled to a forwarding information database (FIB) 16 and a class database (class DB) 18. The firmware logic 14 is also coupled to a plurality of CoS queues 20 which are coupled to schedulers 22, 24. The outputs of the schedulers are coupled via hardware logic 26 to switch ports 28, 30. The hardware logic 26 is partly controlled by software logic 32. According to the presently preferred embodiment, up to twenty-four access ports 12 are provided, each having a bandwidth of 10 Mbps or 100 Mbps and each of the two switch ports 28, 30 has a bandwidth 100 Mbps or 1,000 Mbps.

In operation, the firmware logic 14 receives an ETHERNET frame from one of the ports 12, examines the frame header and looks up information in the FIB 16 and class DB 18 to determine to which of the queues 20 the frame should be sent. The schedulers 22, 24 dequeue the frames from the queues 20 according to priority determined by CoS. The hardware logic 26 receives the frames from the schedulers and passes them to the switch ports 28, 30.

Figure 2:
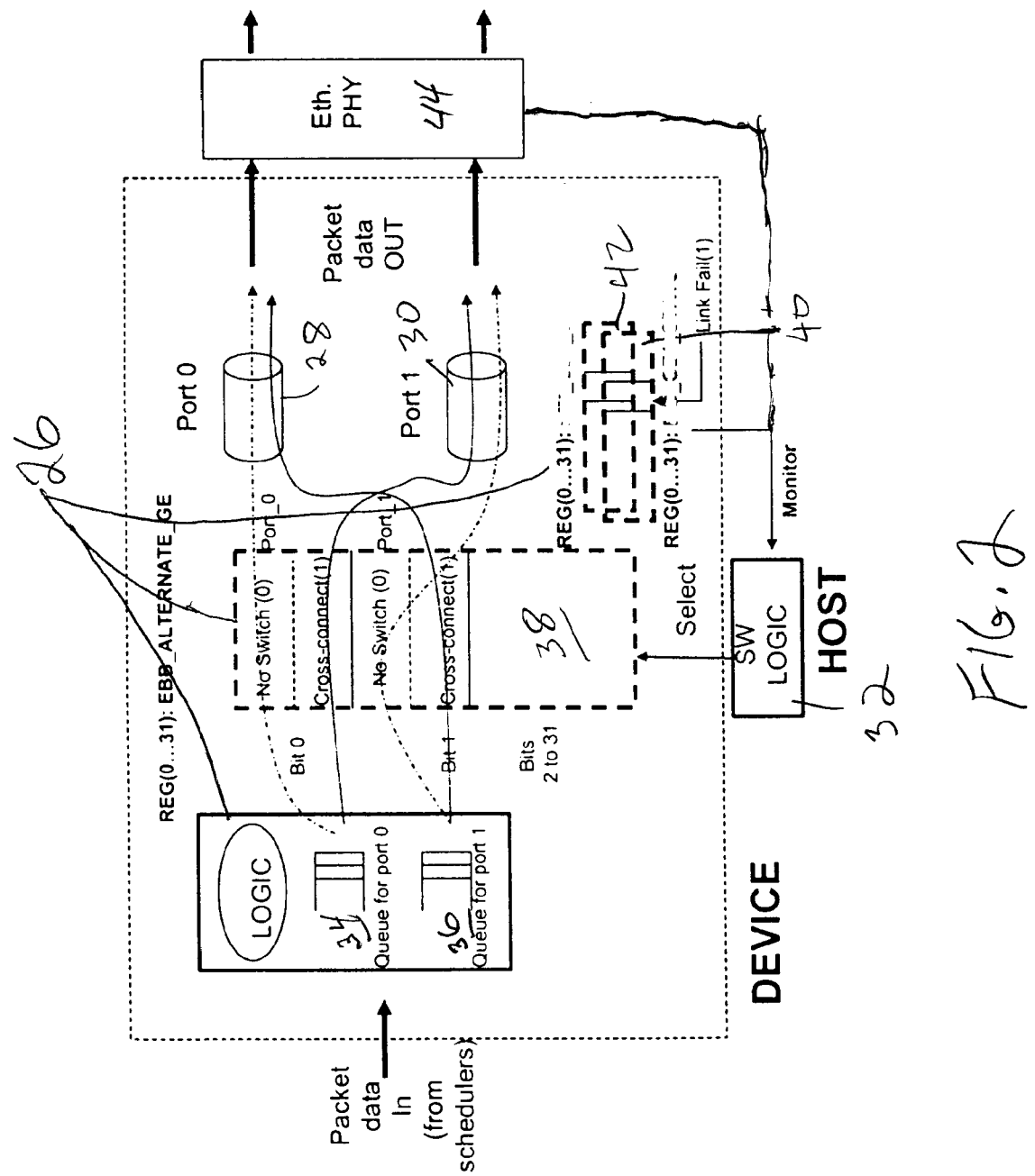
FIG. 2 is a high level block diagram illustrating the overall implementation of the invention in the switch of FIG. 1.

Turning now to FIG. 2, details of the hardware logic 26 are shown in more detail. The logic 26 includes two rate adaptation buffers 34, 36 (one for each switch port, each preferably sized to accommodate one ETHERNET frame), a cross-connect switch 38, and two switch port status registers 40, 42. As illustrated, the switch ports 28, 30 are coupled to an ETHERNET PHY device 44. The software logic 32 partially controls the cross-connect switch 38 based on the content of the status registers 40, 42. The contents of those registers are determined by reading registers on the PHY device 44.

Figure 3:
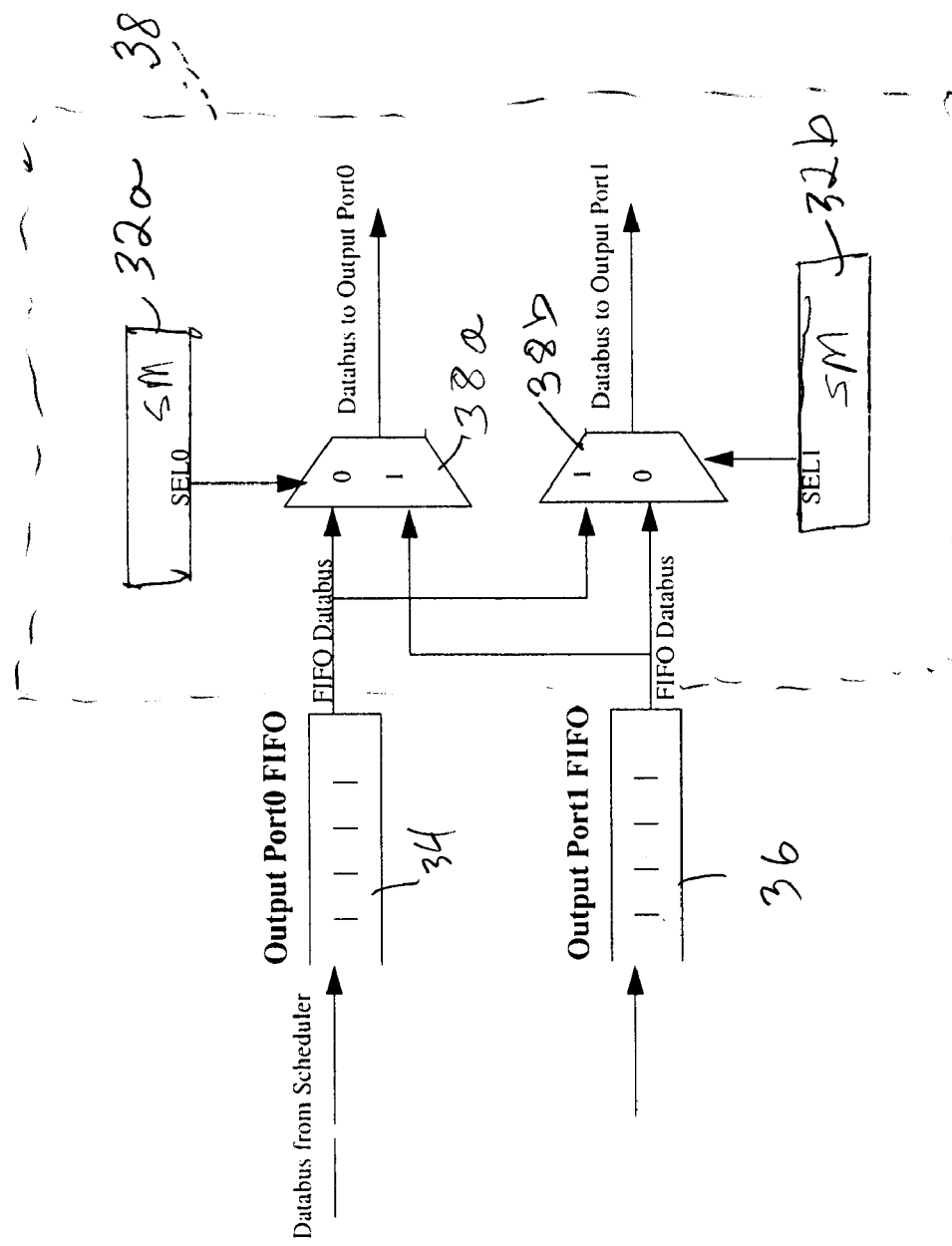
FIG. 3 is a high level block diagram illustrating the cross-over switch as a pair of multiplexers.

As seen in FIG. 3, the cross-connect switch 38 can be implemented as two multiplexers 38a, 38b and two state machines 32a, 32b. The operation of the state machines is described in FIGS. 4 and 5.

Figure 4:
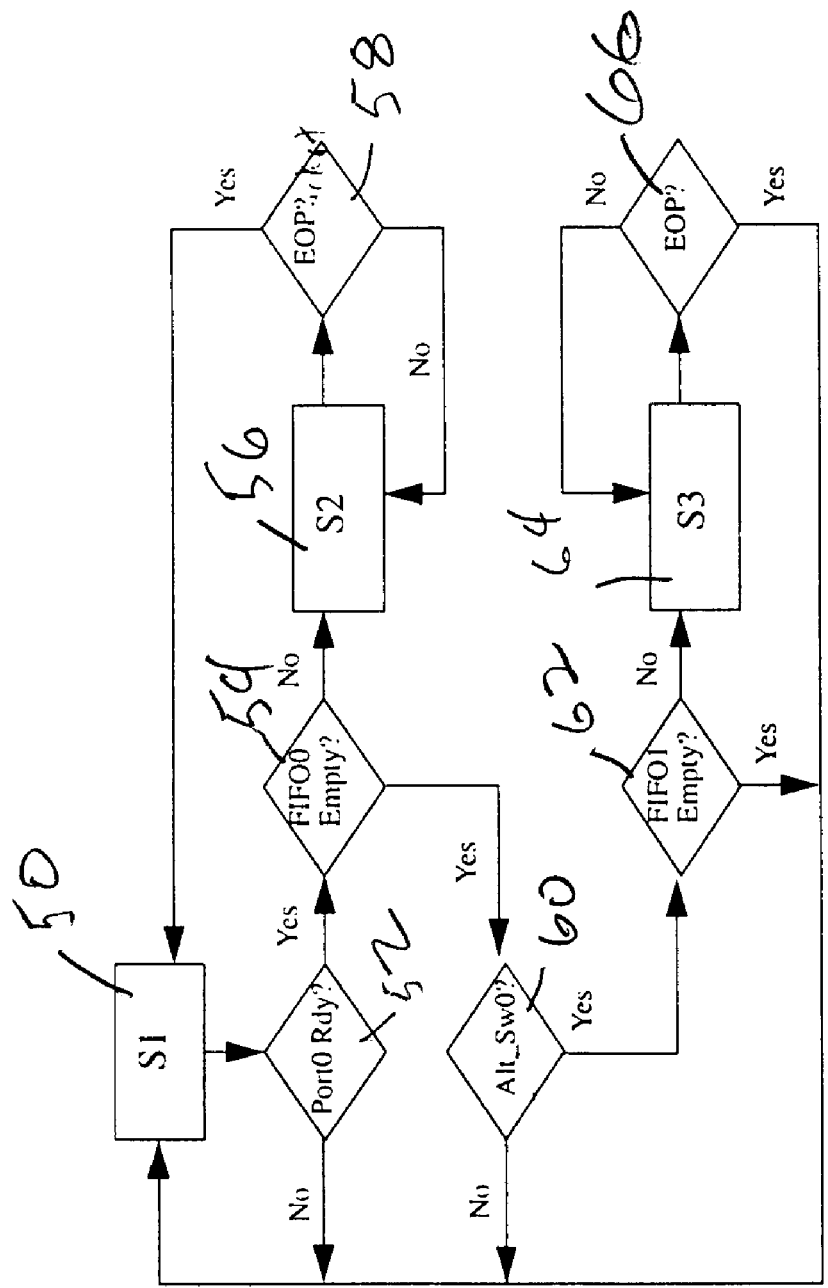
FIG. 4 is a state diagram illustrating the operation of one of the multiplexers.

Turning now to FIG. 4, starting at 50, the state machine 32a is initialized (S1). At 52 it is determined whether Port 0 (28 in FIGS. 1 and 2) is ready. If Port 0 is not ready, the state machine returns to S1. If Port 0 is ready as determined at 52, FIFO 0 is examined at 54 to determine whether a frame is available for transmission. If FIFO 0 is not empty, state 2 (S2) is entered at 56. In state 2, FIFO 0 is read until the end of the frame is detected at 58 (EOP=end of packet). If it was determined at 54 that FIFO 0 is empty, it is then determined at 60 whether alternate switching is turned on for Port 0, i.e. whether multiplexer 38a (FIG. 3) should be switched to allow a frame from FIFO 36 to exit through Port 0 rather than Port 1. Alternate switching is turned on and off by software logic (32 in FIGS. 1 and 2) as explained in detail with reference to FIGS. 6-8. If alternate switching is turned on, the content of FIFO 1 is determined at 62. If FIFO 1 is not empty, state three (S3) is entered at 64 where FIFO 1 is read until the end of the FRAME is detected at 66, then the machine returns to S1.

Figure 5:
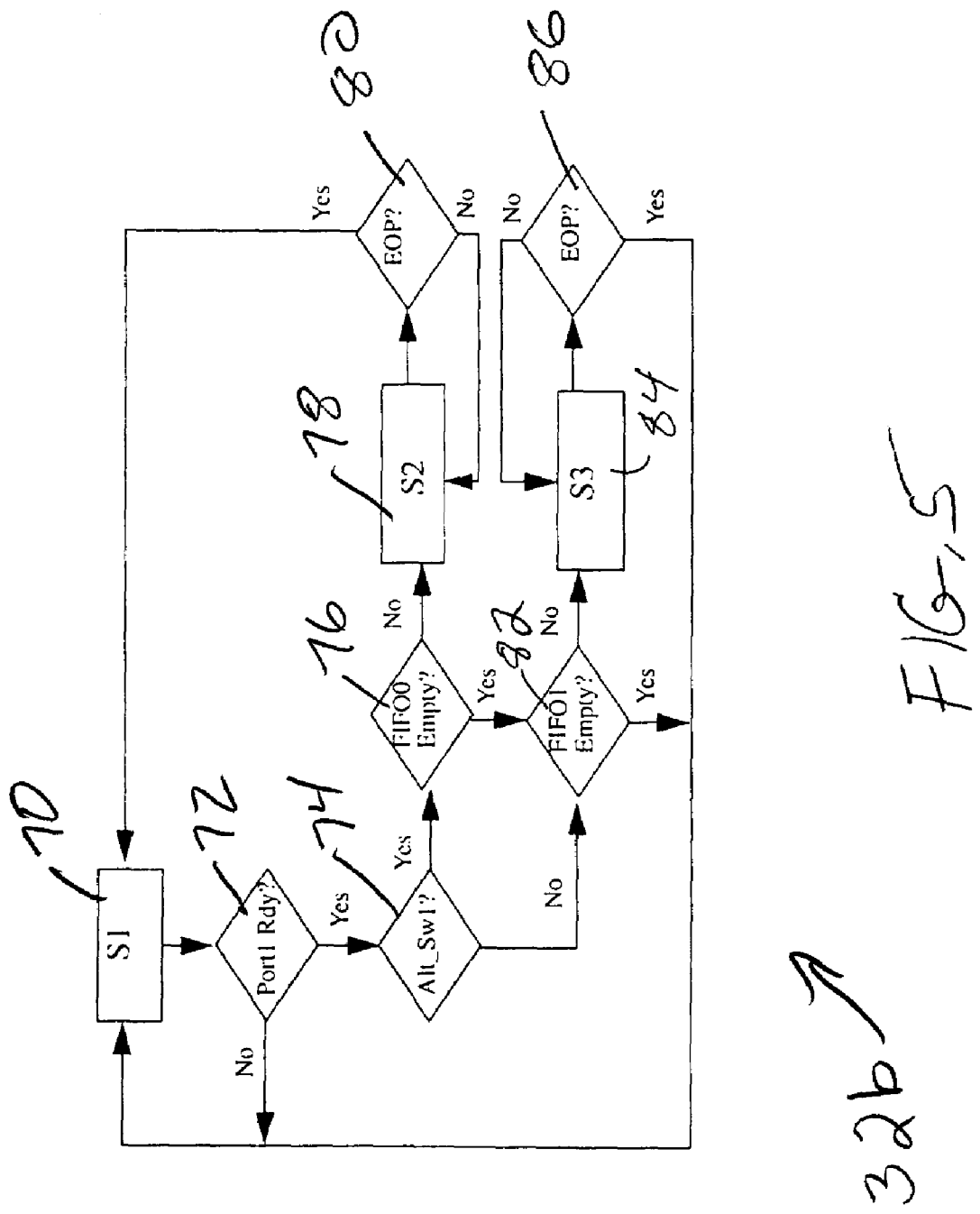
FIG. 5 is a state diagram illustrating the operation of the other multiplexer.

FIG. 5 illustrates the operation of state machine 32b. Starting at state one (S1) 70, the machine initializes and checks at 72 to see if Port 1 is ready. If Port 1 is ready, it is determined at 74 whether alternate switching is turned on for Port 1. Alternate switching is turned on and off by software logic (32 in FIGS. 1 and 2) as explained in detail with reference to FIGS. 6-8. If it is turned on and FIFO 0 is not empty as determined at 76, state two (S2) is entered at 78. In state two (S2), FIFO 0 is read until the end of the frame as determined at 80, the machine returns to (S1) 70. If it was determined at 74 that alternate switching was not turned on or at 76 that FIFO 0 was empty, the status of FIFO 1 is determined at 82. If FIFO 1 is not empty, state three (S3) is entered at 78. In state three FIFO 1 is read until the end of the frame as determined at 86. When FIFO 1 is empty as determined either at 82 or 86, the machine returns to (S1) 70.

Figure 6:
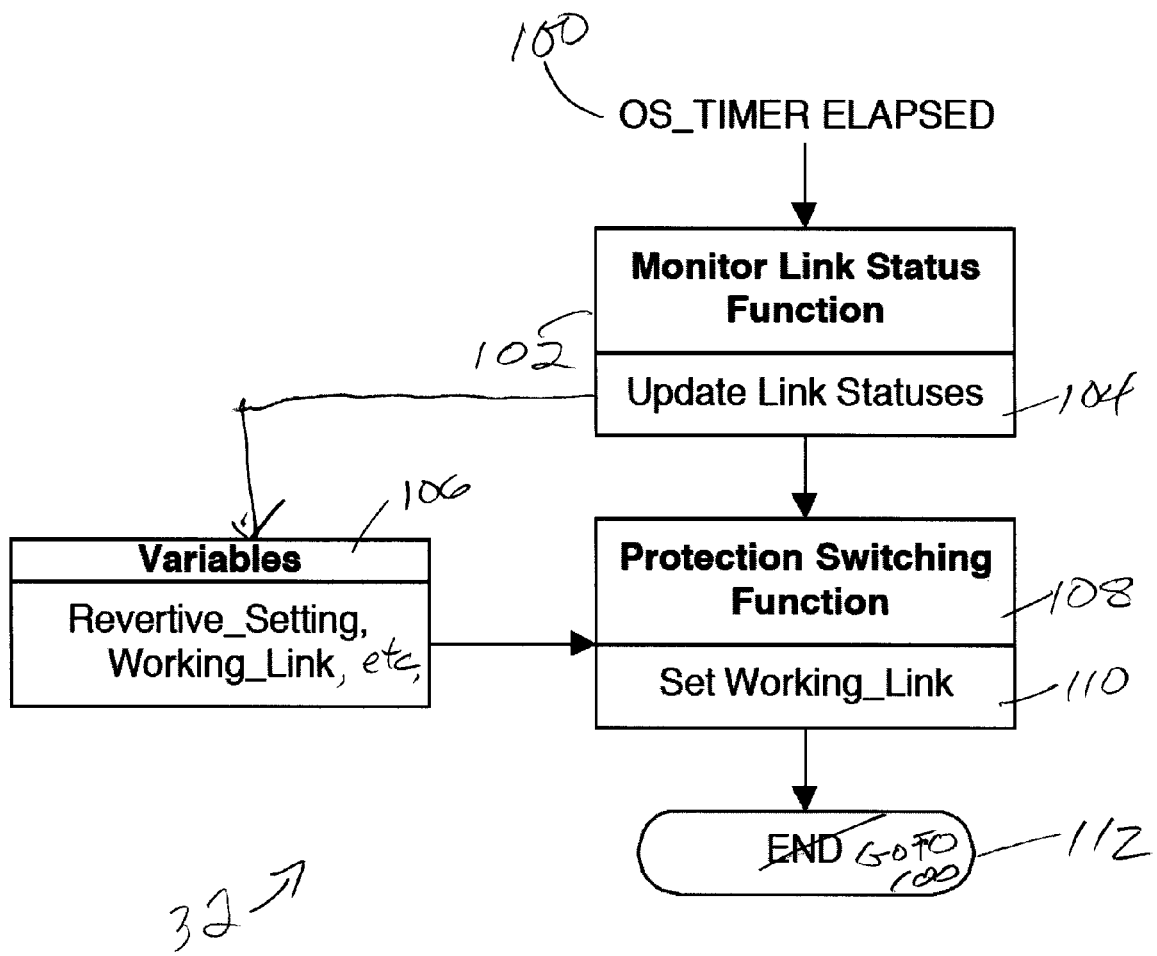
FIG. 6 is a high level flow chart illustrating the software logic of FIGS. 1 and 2.

Turning now to FIG. 6, the software logic (32 in FIGS. 1 and 2) runs on a host processor (not shown) and is based on an operating system timer, preferably set to 25 ms. When the timer counts to zero as determined at 100 in FIG. 6, the monitor link status function is performed at 102. This function is described in more detail in FIG. 7. The monitor link status function updates the link statuses at 104 which are stored with variables at 106. The protection switching function 108 examines the link statuses from the variables 106 and sets the Working_Link variable at 110 which is stored in variables 106. Using the Working_Link, revertive setting, and a restore timer value, the protection switching function sets a switch or no switch flag according to the truth table of FIG. 8. This flag is used to make the determinations 60 and 74 in FIGS. 4 and 5 respectively. As indicated at 112, the timer is watched again at 100 so that these functions are performed every 25 ms.

Figure 7:
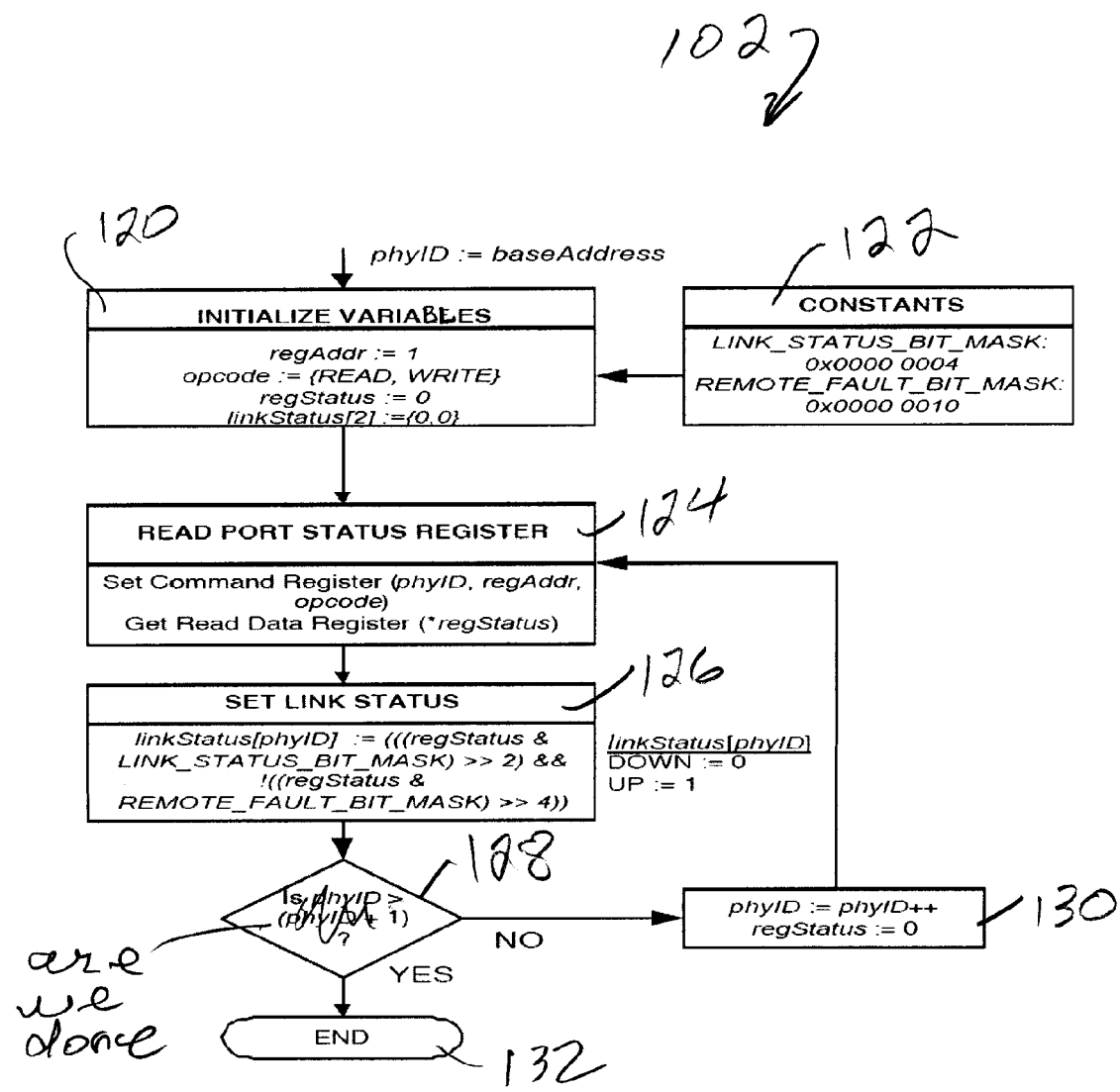
FIG. 7 is a high level flow chart illustrating the monitor link status function of FIG. 6.

FIG. 7 illustrates how the monitor link status function sets the link status registers. Starting with phyID set to the base address (e.g. Port 0) variables are initialized at 120 based on constraints 122. It will be appreciated that a 32-bit register having regAddr=1 on PHY device having PhyID will be read and two items of information will be obtained by applying the masks listed in the constraints. Reading of the register takes place at 124 using two commands. "Set Command Register" reads the register on the PHY device and puts the contents in a local register called "Read Data Register". The "Get Read Data Register (*regStatus) moves the contents to a software variable called "regStatus". The Link Status is set at 126 by applying the two masks to the contents of the variable regStatus. It will be appreciated that the link failure could be due to a local hardware problem or due to a remote fault or both. At 128 it is determined whether both ports have been checked. If not, regStatus is set back to zero and phyID is incremented at 130 and the Port status register for Port 1 is read at 124 and Link status set for Port 1 at 126. It will then be determined at 128 that the status for both ports has been set and the function 102 will have completed as indicated at 132.

Those skilled in the art will appreciate that at the time of a link failure, there may be many frames residing in the CoS queues (20 in FIG. 1) which are destined for the failed link. According to the prior art practices, these frames will continue to flow toward the failed link until the spanning tree protocol changes the network topology and entries in the data base(s) are changed to direct frames to the backup link. Only after the data base(s) is updated will frames be sent to the backup link which otherwise would have been sent to the failed link. Since this may take some time, a serious interruption in service will be noticed, particularly in services such as video on demand, video conferencing, and voice over IP. According to the present invention, however, upon detecting a failure, the cross-over switch is activated in a matter of microseconds and all of the frames destined for the failed link are now automatically re-routed by hardware to the backup link and few frames are lost.

FIG. 8 illustrates the switch function action based on which link is the working link, whether reverting is allowed, whether restore time has elapsed (whether the failed link has been restored) and the link status. When Port 0 is the working link, a switch to Port 1 is made only when Link 0 status is OFF and Link 1 status is ON. There is no switch made at any other time. When Port 1 is the working link, a switch back to Port 0 (reversion) is made only when Port 0 becomes active after the restore time has elapsed.

Figure 9:
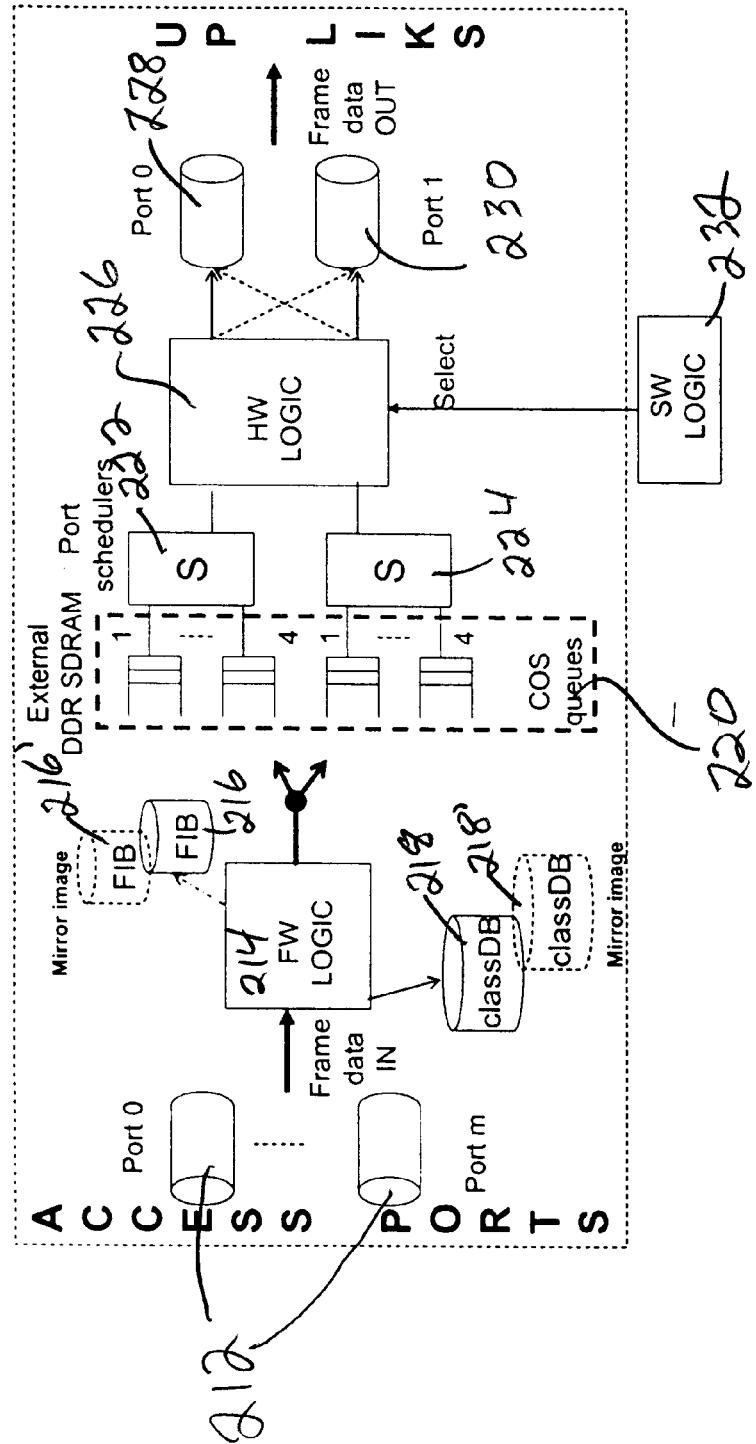
FIG. 9 is a high level block diagram of a subscriber premises ETHERNET switch incorporating the invention.

Turning now to FIG. 9, a subscriber premises switch 210 incorporating the invention includes a plurality of access ports 212 (Ports 0 through m) which are coupled to user network devices at subscriber premises. The access ports 212 are coupled to firmware logic 214 which is coupled to an FIB 216 and class DB 218. The firmware logic 214 is also coupled to a plurality of CoS queues 220 which are coupled to schedulers 222, 224. The outputs of the schedulers are coupled via hardware logic 226 to uplink ports 228, 230. The hardware logic 226 is partly controlled by software logic 232. According to the presently preferred embodiment, access ports 12 each have a bandwidth of 10 Mbps or 100 Mbps and each of the two uplink ports 228, 30 has a bandwidth 10 Mbps or 100 Mbps.

In operation, the firmware logic 214 receives an ETHERNET frame from one of the ports 212, examines the frame header and looks up information in the FIB 216 and class DB 218 to determine to which of the queues 220 the frame should be sent. The schedulers 222, 224 dequeue the frames from the queues 220 according to priority determined by CoS. The hardware logic 226 receives the frames from the schedulers and passes them to the uplink ports 228, 230. According to an embodiment of the invention, a mirror FIB database 216' is provided for the FIB database 216 and/or a mirror class database 218' is provided for the class database 218.

Figure 10:
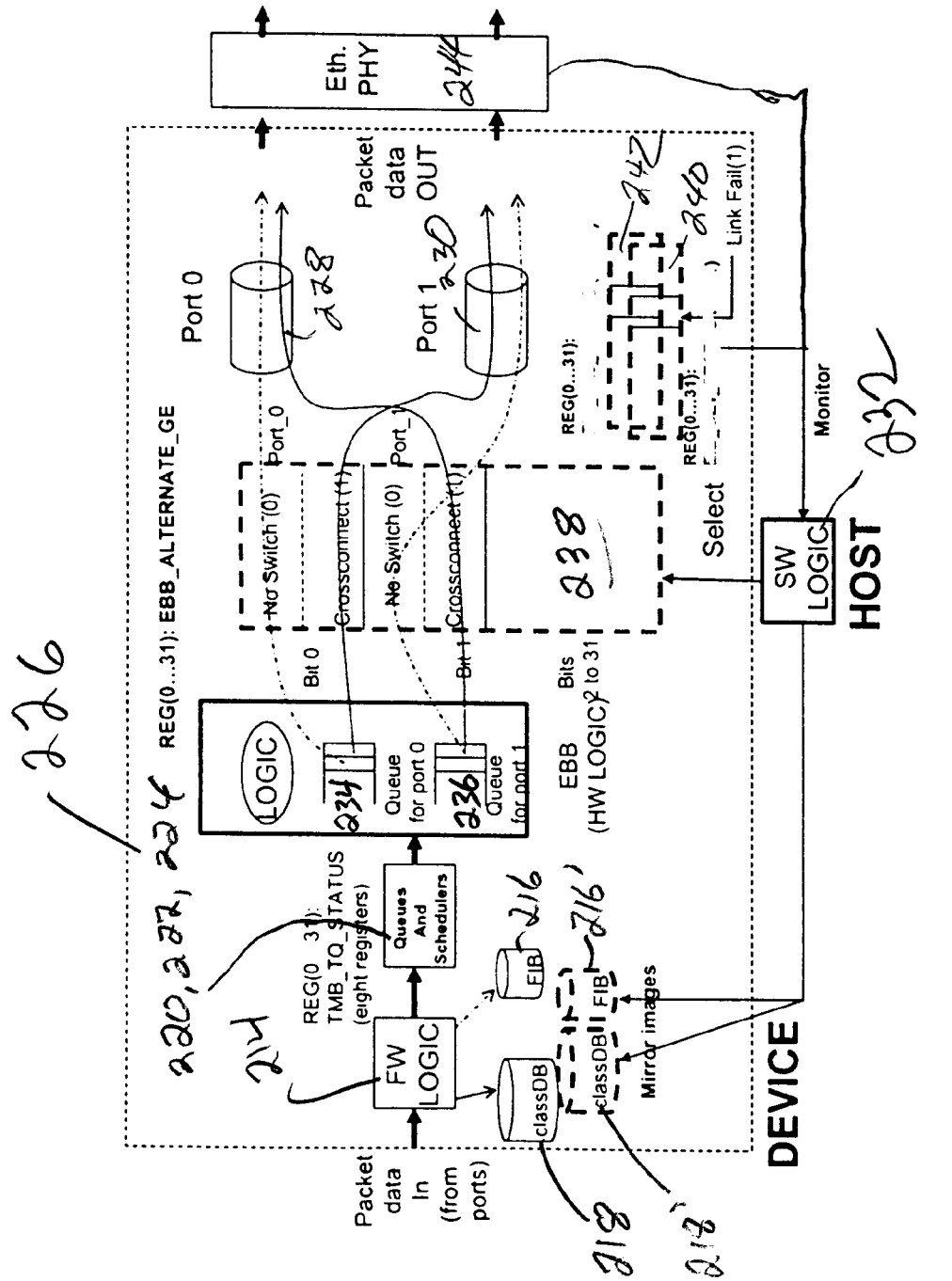
FIG. 10 is a high level block diagram illustrating the overall implementation of the invention in the switch of FIG. 9.

Turning now to FIG. 10, the operation of the hardware logic 226 is shown in more detail. The logic 226 includes two rate adaptation buffers 234, 236 (one for each uplink port, each preferably sized to accommodate one ETHERNET frame), a cross connect switch 238, and two switch port status registers 240, 242. As illustrated, the switch ports 228, 230 are coupled to an ETHERNET PHY device 244. The software logic 232 partially controls the cross connect switch 238 based on the content of the status registers 240, 242. The contents of those registers are determined by reading registers on the PHY device 244. The switch 210 and associate logic operates in substantially the same manner as the switch 10 described above except for the mirror databases. The overall switching function is shown in FIG. 11 and the database switching function is shown in FIG. 12.

Figure 11:
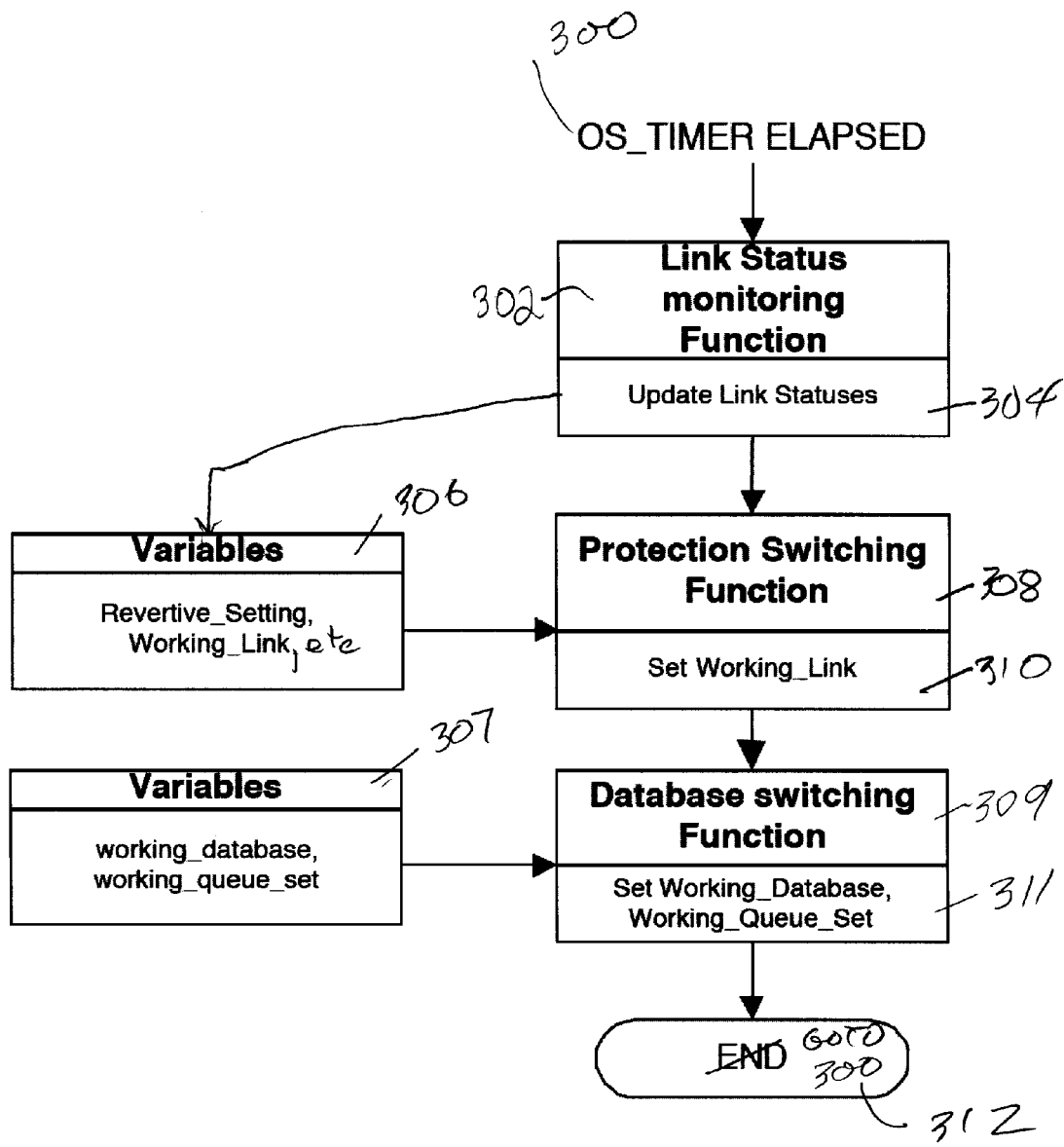
FIG. 11 is a high level flow chart illustrating the software logic of FIGS. 9 and 10.

Referring now to FIG. 11 (which is similar to FIG. 6), the software logic (232 in FIGS. 9 and 10) runs on a host processor (not shown) and is based on an operating system timer, preferably set to 25 ms. When the timer counts to zero as determined at 300 in FIG. 11, the monitor link status function is performed at 302. This function is described in more detail in FIG. 7. The monitor link status function updates the link statuses at 304 which are stored with variables at 306. The protection switching function 308 examines the link statuses from the variables 306 and sets the Working_Link variable at 310 which is stored in variables 306. Using the Working_Link, revertive setting, and OS timer value, the protection switching function sets a switch or no switch flag according to the truth table of FIG. 8. This flag is used to make the determinations 60 and 74 in FIGS. 4 and 5 respectively. In addition, a database switching function 309 is provided which sets the working database(s) and working queue set at 311 based in part on the variables at 307. As indicated at 312, the timer is watched again at 300 so that these functions are performed every 25 ms.

Figure 12:
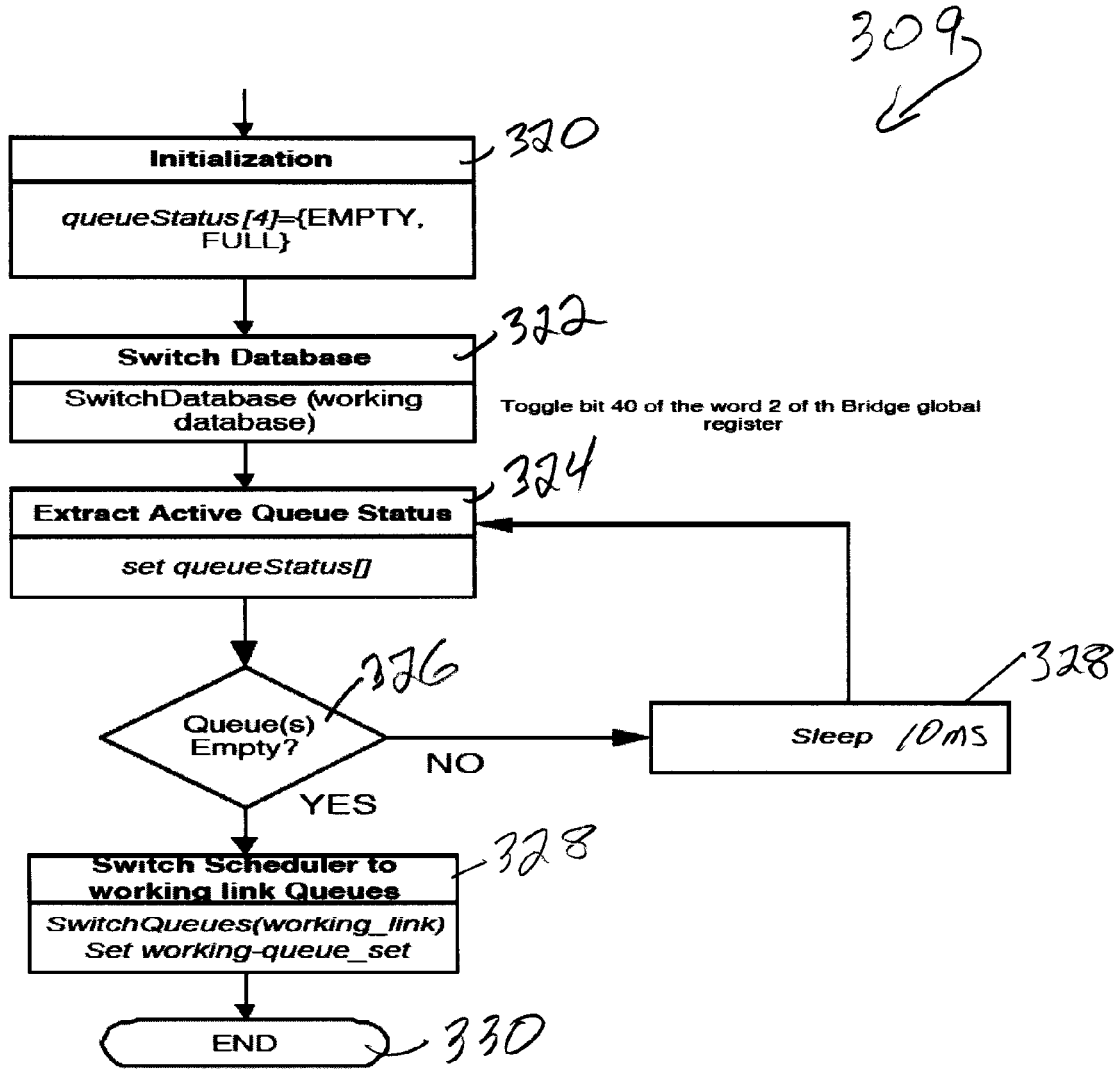
FIG. 12 is a high level flow chart illustrating the database switching function of FIG. 11.

Referring now to FIG. 12, queue status is initialized at 320 and the data base is switched to the mirror at 322. The status of the active queues is determined at 324 and it is determined at 326 whether the queues are all empty. If not, after a 10 ms wait at 328 the queues are checked again. If the queues are all empty as determined at 326, the schedulers are switched to working link queues at 328 and the function is complete at 330. Thus, the customer equipment keeps using the old database entries (from the mirrors) and the queues for the failed port (but redirected to the backup port) while the STP updates the main databases, then switches to the queues for the failed port and switches back to the main databases and makes new mirrors.

There have been described and illustrated herein several embodiments of methods and apparatus for fast ETHERNET switchover in the event of a link failure. While particular embodiments of the invention have been described, it is not intended that the invention be limited thereto, as it is intended that the invention be as broad in scope as the art will allow and that the specification be read likewise. Thus, while a particular number of ports and queues have been disclosed, it will be appreciated that different numbers could be used as well. In addition, while particular registers have been disclosed, it will be understood that in different implementations, different registers might be used. Furthermore, while particular switching circuits, state machines and software has been disclosed it will be understood that other circuits, state machines and software may achieve the same functions. It will therefore be appreciated by those skilled in the art that yet other modifications could be made to the provided invention without deviating from its spirit and scope as claimed.

What is claimed is:

1. An apparatus for use in an ETHERNET switch, comprising:
    a primary output port and a secondary output port, said primary and secondary output ports operably coupled to an ETHERNET PHY device;
    a register indicating link status of the primary and secondary output ports;
    a first queue associated with the primary output port;
    a second queue associated with the secondary output port;
    a first plurality of class-of-service queues for buffering packet data received from a plurality of input ports, and a first port scheduler for scheduling transfer of packet data from the first plurality of class-of-service queues to said first queue;
    a second plurality of class-of-service queues for buffering packet data received from the plurality of input ports, and a second port scheduler for scheduling transfer of packet data from the second plurality of class-of-service queues to said second queue;
    switch means, coupled between said first and second queues and said primary and secondary output ports, for directing the packet data stored in the first and second queues to one or both primary and secondary output ports; and
    logic arranged to accept input from the register and operate said switch means to direct the packet data stored in the first queue to the secondary output port when the link status of the primary output port indicates that the link is down.

2. The apparatus according to claim 1, wherein:
said logic operates said switch means to direct the packet data stored in the second queue to the primary output port when the link status of the secondary output port indicates that the link is down.

3. The apparatus according to claim 1, wherein:
said logic is a combination of hardware and software.

4. The apparatus according to claim 3, wherein:
said hardware includes a state machine.

5. The apparatus according to claim 3, wherein:
said software includes a timer.

6. The apparatus according to claim 5, wherein:
the timer has a default value of 25 milliseconds.

7. The apparatus according to claim 1, wherein:
said first and second queues are each sized to accommodate one ETHERNET frame.

8. The apparatus according to claim 1, wherein:
said switch means comprises a pair of multiplexers each having two inputs and an output, each input of each multiplexer being coupled to an output of one of said first and second queues and each output of said multiplexer being coupled to one of said primary and secondary output ports.

9. The apparatus according to claim 8, wherein:
each multiplexer has a select input which is coupled to said logic.

10. The apparatus according to claim 9, wherein:
said logic includes two state machines, each controlling one of said multiplexers.

* * * * *